(12) United States Patent
Fernandez (10) Patent No.: US 11,199,005 B2
(45) Date of Patent: Dec. 14, 2021

(54) BISTABLE COLLAPSIBLE TUBULAR MAST BOOM

(71) Applicant: UNITED STATES OF AMERICA AS REPRESENTED BY THE ADMINISTRATOR OF NASA, Washington, DC (US)

(72) Inventor: Juan M. Fernandez, Norfolk, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 208 days.

(21) Appl. No.: 16/503,663

(22) Filed: Jul. 5, 2019

(65) Prior Publication Data

US 2020/0011057 A1 Jan. 9, 2020

Related U.S. Application Data (60) Provisional application No. 62/694,469, filed on Jul. 6, 2018.

(51) Int. Cl.
*E04C 3/00* (2006.01)
*E04C 2/296* (2006.01)
*B29L 23/00* (2006.01)
*B64G 1/22* (2006.01)

(52) U.S. Cl.
CPC ......... *E04C 3/005* (2013.01); *B29L 2023/001* (2013.01); *B64G 1/222* (2013.01); *E04C 2/296* (2013.01)

(58) Field of Classification Search
CPC ... E04C 3/005; E04C 3/28; E04C 3/29; E04C 3/36; E04C 2/296; B29L 2023/001
USPC .......................................................... 52/108
See application file for complete search history.

(56) References Cited

U.S. PATENT DOCUMENTS

| | | | |
|---|---|---|---|
| 7,895,795 B1 * | 3/2011 | Murphey | E04C 3/28 52/108 |
| 8,683,755 B1 * | 4/2014 | Spence | B64G 1/222 52/108 |
| 9,863,148 B2 | 1/2018 | Fernandez | |

(Continued)

OTHER PUBLICATIONS

Fernandez, J.M., "Advanced Deployable Shell-Based Composite Booms for Small Satellite Applications including Solar Sails", 4th International Symposium on Solar Sailing, Jan. 17-20, 2017, Kyoto, Japan, pp. 1-19.

(Continued)

*Primary Examiner* — Christine T Cajilig
(74) *Attorney, Agent, or Firm* — M. Bruce Harper; Andrea Z. Warmbier; Helen M. Galus (57) ABSTRACT

Various embodiments provide for bistable collapsible tubular mast (Bi-CTM) booms. Various embodiments provide CTM booms that may be bistable in nature, thereby achieving intrinsic benefits bistability may bring. Bistability may be achieved in various embodiments through specific combinations of the thin-shell cross-section geometry and the composite laminate selected for each thin-shell segment. Additionally, in various embodiments, the thin-shell geometry of each boom half may be different. Various embodiments may include combinations of circular, ellipsoidal, or parabolic segments that form each shell.

8 Claims, 6 Drawing Sheets

(56) References Cited

U.S. PATENT DOCUMENTS

| | | | | |
|---|---|---|---|---|
| 2006/0272265 | A1* | 12/2006 | Pryor | E04C 3/005 |
| | | | | 52/645 |
| 2014/0230949 | A1* | 8/2014 | Daton-Lovett | F16L 9/02 |
| | | | | 138/177 |
| 2015/0259911 | A1* | 9/2015 | Freebury | B29C 70/30 |
| | | | | 52/108 |
| 2016/0052225 | A1* | 2/2016 | Francis | B32B 3/04 |
| | | | | 138/128 |
| 2016/0177567 | A1* | 6/2016 | Gandhi | E04C 3/005 |
| | | | | 52/108 |
| 2017/0058524 | A1* | 3/2017 | Fernandez | B64G 1/222 |
| 2018/0313083 | A1* | 11/2018 | Murphey | E04C 3/28 |

OTHER PUBLICATIONS

Lee, A.J., and J.M. Fernandez, "Mechanics of Bistable Two-Shelled Composite Booms", 2018 AIAA Spacecraft Structures Conference, Jan. 8-12, 2018, Kissimmee, FL, pp. 1-24.

Fernandez, J.M., and A.J. Lee, "Bistable Collapsible Tubular Mast Booms", 3rd International Conference on Advanced Lightweight Structures and Reflector Antennas, Sep. 19-21, 2018, Tbilisi, Georgia, pp. 1-14.

Fernandez. J.M., and A.J. Lee, "Bistability in Collapsible Tubular Mast Booms", 2019 AIAA Spacecraft Structures Conference. Jan. 7-11, 2019, San Diego, CA, pp. 1-16.

Lee, A.J. and J.M. Fernandez, "Inducing bistability w Collapsible Tubular Mast booms with thin-ply composite shells", Composites Structures 225 (2019) 111168, pp. 1-10.

* cited by examiner

BISTABLE COLLAPSIBLE TUBULAR MAST BOOM

CROSS-REFERENCE TO RELATED PATENT APPLICATION(S)

This patent application claims the benefit of and priority to U.S. Provisional Patent Application 62/694,469, filed on Jul. 6, 2018, the contents of which are hereby incorporated by reference in their entirety.

STATEMENT REGARDING FEDERALLY SPONSORED RESEARCH OR DEVELOPMENT

The invention described herein Was made by an employee of the United States Government and may be manufactured and used by or for the Government of the United States of America for governmental purposes without the payment of any royalties thereon or therefore.

BACKGROUND OF THE INVENTION

Thin-shell rollable composite booms are a promising cross-cutting technology candidate for a wide range of deployable space structures. The majority of the thin-shell boom structures developed to date have used an open or semi-open cross-section that poses some restrictions on the structural capabilities of these slender elements to avoid them failing in a flexural-torsional buckling mode. The Collapsible Tubular Mast (CTM), with its two omega-shaped thin-shells forming a bonded closed section, is one of the highest performance boom structures that yields large specific stiffnesses and allows for high dimensional stability structures.

A recent effort proposed inducing on these rollable structures bistability, or the existence of two potential energy wells in the deployed and coiled boom states. Bistable booms are favorable due to low strain energy requirements for the coiled state, and have more controllable self-deployment when compared to monostable booms that overall translates to more reliable, compact, and lighter system designs. A bistable CTM boom could perform as the ultimate candidate for these types of coilable structures. The ultimate objective of producing a bistable CTM boom, over a monostable one, is to simplify the packaging and deployment process of complex deployable structures supported by these boom elements, as well as increase the reliability of designs that are strain energy driven versus motor driven or any other type of powered actuation.

BRIEF SUMMARY OF THE INVENTION

Various embodiments provide for bistable collapsible tubular mast (Bi-CTM) booms. Various embodiments provide CTM booms that may be bistable in nature, thereby achieving intrinsic benefits bistability may bring. Bistability may be achieved in various embodiments through specific combinations of the thin-shell cross-section geometry and the composite laminate selected for each thin-shell segment. Additionally, in various embodiments, the thin-shell geometry of each boom half may be different. Various embodiments may include combinations of circular, ellipsoidal, or parabolic segments that form each shell. The provisioning of two different cross section shells in various embodiments may provide additional design freedom to maximize the area moment of inertia and torsional constant, which may be directly proportional to the loading capacity of the boom, while retaining bistability.

Various embodiments may provide a Bi-CTM boom including a first shell comprised of a first composite laminate, and a second shell comprised of a second composite laminate, wherein the first shell is affixed to the second shell, and the first composite laminate is different than the second composite laminate. In various embodiments, the first composite laminate may be a bistable laminate. In various embodiments, the bistable laminate may have a lay up that is bistable. As examples, the bistable laminate may have a lay up of $[\pm\theta_i/0_j/\pm\theta_i]$, $[\pm\theta_i/0_j/90_k/\pm\theta_i]$ or $[\pm\theta_i/\pm\theta_i]$ on the longest shell segment of the first shell, where $\theta$ is from 30° to 60°, i is 1 or above, j is 0 or above, and k is 0 or above. In various embodiments, the first shell and the second shell may have a same cross-section shape. In various embodiments, the first shell and the second shell may have different cross-section shapes. In various embodiments, the first shell may have a circular, an ellipsoidal, or a parabolic cross-section shape and the second shell may have a different cross-section shape than the first shell. Various embodiments may provide a method of fabricating a Bi-CTM boom.

These and other features, advantages, and objects of the present invention will be further understood and appreciated by those skilled in the art by reference to the following specification, claims, and appended drawings.

BRIEF DESCRIPTION OF THE. SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be Construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Standard monostable booms can store a large amount of strain energy when coiled and can uncontrollably expand (blossom) inside the deployer mechanism during deployment. In general, bistable booms store less strain energy when coiled and have a slower more controllable and coherent deployment. Various embodiments aim to tailor the beneficial bistability effect for composite booms.

Various embodiments provide a new type of rollable and deployable composite beam/boom structure that may be used in a wide range of applications for both space and terrestrial structural solutions. The Collapsible Tubular Mast (CTM) (also sometimes referred to as a lenticular boom), with its two omega-shaped thin-shells forming a bonded closed section, is one of the highest performance thin-shell rollable booms that yields large specific stiffnesses and allows for high dimensional stability structures. The various embodiments may provide a bistable version of the CTM boom that has a secondary stable low energy state in the coiled configuration, similar to a kid's slap bracelet. This secondary stable low energy state in the coiled configuration realized in various embodiments may simplify the stowage process with a reduction in the size, mass and complexity of the deployment mechanism, as well as to yield a more coherent and controllable extension of the boom upon release of its constraints when compared to non-bistable booms.

In comparison to standard CTM booms used on a numerous of occasions in spacecraft hardware, the various embodiments bistable CTM booms (Bi-CTM booms) are differentiated in that the embodiment Bi-CTM booms are bistable in nature, with all the intrinsic benefits bistability brings. Bistability may be achieved in various embodiments through combinations of the thin-shell cross-section geometry and the composite laminate chosen for each thin-shell segment. An additional feature exclusive of the embodiment Bi-CTM booms is the fact that the thin-shell geometry of each boom half may be different, breaking the symmetry from the standard CTM boom designs. Combinations of circular, ellipsoidal, and/or parabolic segments that form each shell of the embodiment Bi-CTM booms may provide additional design freedom to maximize the area moment of inertia and torsional constant, which are directly proportional to the loading capacity of the boom, while retaining bistability.

Figure 1:
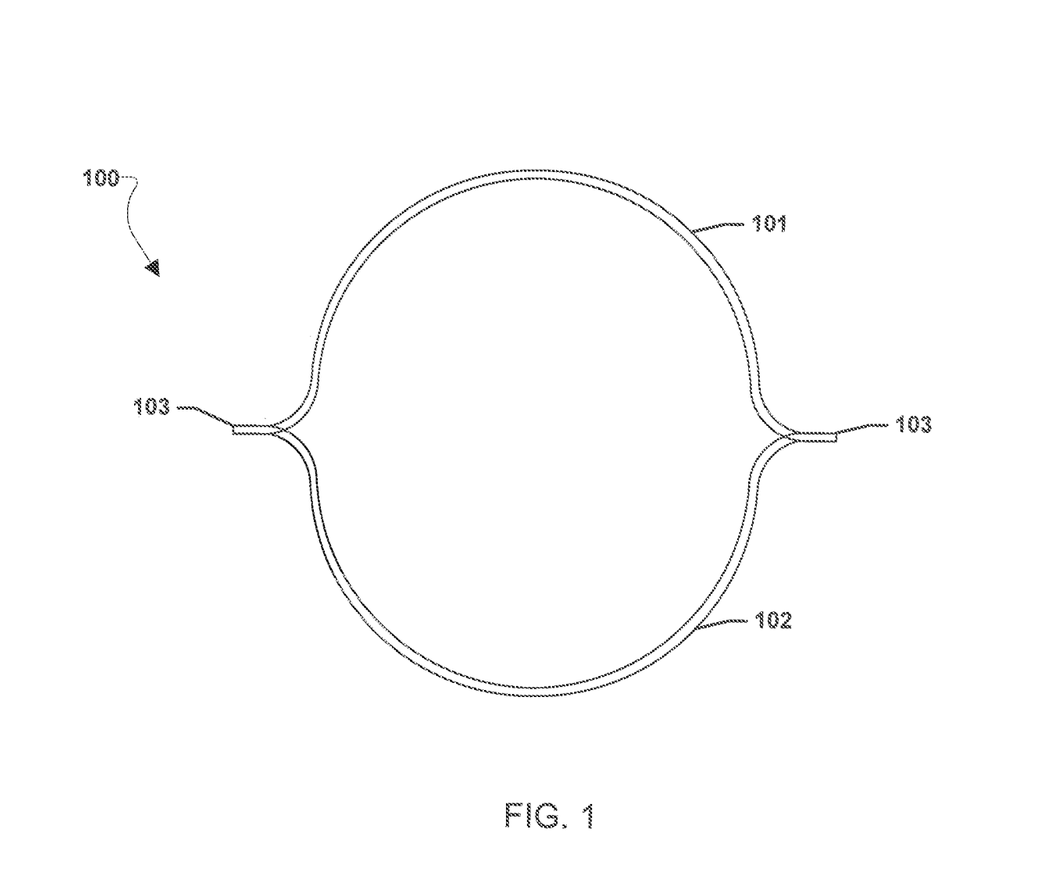
FIG. 1 is a diagram illustrating a cross section of an example Bi-Stable Collapsible Tubular Mast (Bi-CTM) boom geometry.

FIG. 1 illustrates an example of Bi-CTM boom geometry via a cross section of a Bi-CTM boom 100. The Bi-CTM boom geometry consists of affixing two omega-shaped shells 101 and 102 at two flat regions on each shell edge, called the web 103. The cross-section of each omega shell 101, 102 can be defined by three circular, elliptical or parabolic arcs or combinations of these arcs, plus the two straight sections 103 that are affixed. Examples of CTM booms and their operation are discussed in U.S. Pat. No. 9,863,148 incorporated herein by reference in its entirety for all purposes. In various embodiments, the various shells may be tape springs of a given length that may be made from any material, such as Carbon Fiber Reinforced Polymer (CFRP), Fiber Reinforced Plastics (FRPs), Carbon Fiber Reinforced Plastic, Glass Fiber Reinforced Plastic or Kevlar Reinforced Plastic, etc. Bi-CTM booms may be manufactured by affixing (e.g., joint, such as bonding, stitching, welding, etc., co-curing, or otherwise structurally affixing to one another) two shells together. The resulting Bi-CTM boom may be coiled around a spindle/drum (or itself) in a stored configuration and the two shells may flatten together in the stored (i.e., flattened and coiled) configuration. In a deployed configuration the shells may uncoil (i.e., straighten out) and press apart from one another recovering their initial cross-section. As discussed herein, the outer shell of a Bi-CTM boom may be the shell that will be outward to the spindle/drum in the stored coiled configuration. As discussed herein, the inner shell of the Bi-CTM may be shell that will be inward to the spindle in the stored coiled configuration.

An inextensional analytical model describing the coiling mechanics of CTM booms was used to determine how design variables induce bistability. The effects of varying thin-ply lamina material, laminate layup, and shell arc geometries between different inner and outer shell segments on the depth of the second strain energy well corresponding to the coiled state were determined for both symmetrical and asymmetrical boom cross-sections. To determine which model parameters were critical for inducing bistability in two-shelled composite CTM booms, a bistability criterion was also derived. This criterion allowed the direct evaluation of bistability without the need for minimizing the strain energy for every particular case during parametric studies, which is much less computationally efficient. CTM boom designs that were predicted to be bistable were manufactured and experimentally characterized for comparisons against model results. The full design space for two-shelled composite CTM booms was explored to evaluate the validity of the analytical model. After the analytical model was validated, the parametric study searched for Bi-CTM boom designs that maximized the area moments of inertia and torsional constant (loading capability) while complying with the volume requirements of a specific structural application.

Figure 2:
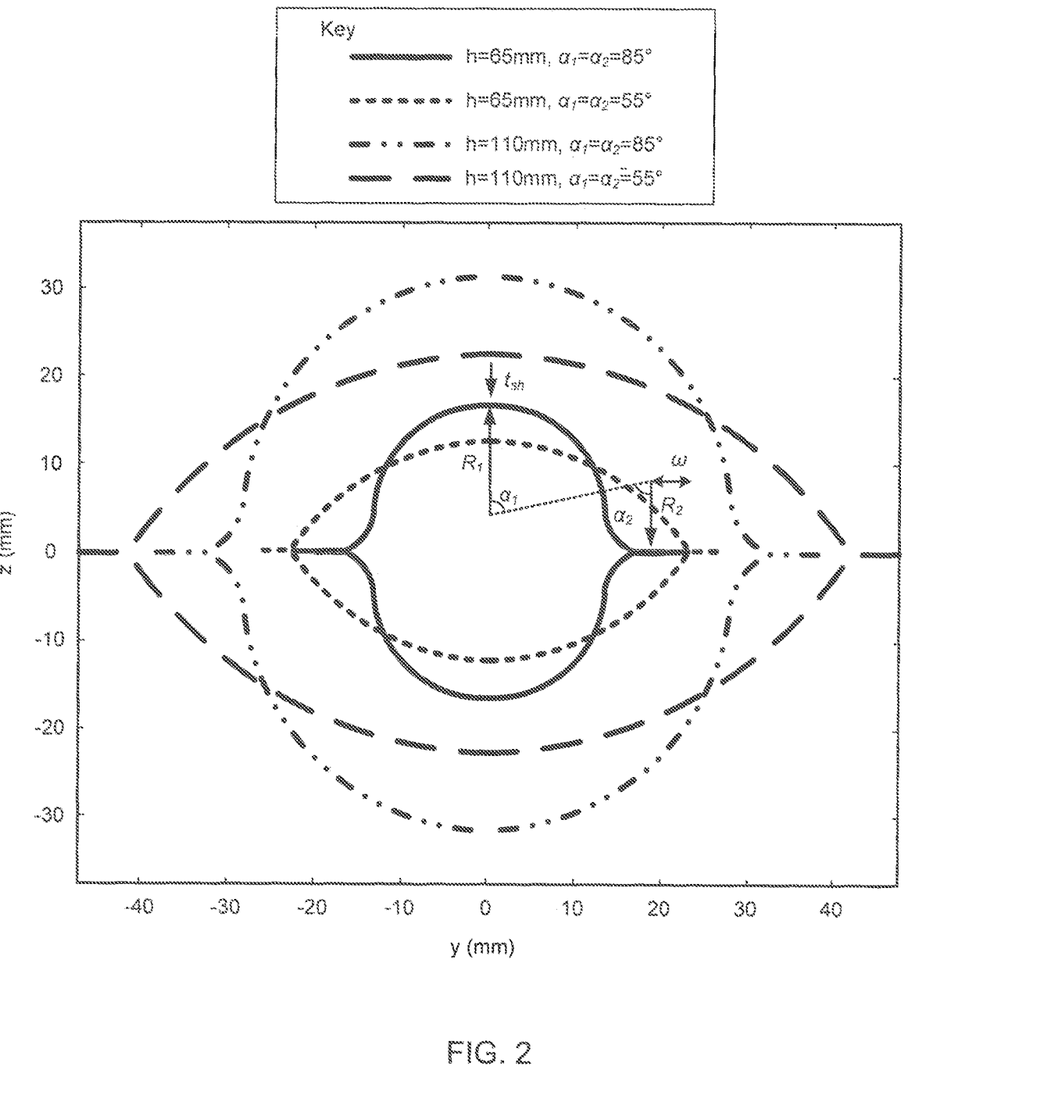
FIG. 2 illustrates cross-section shapes of two symmetric Bi-CTM booms with different flattened heights and subtended angles of the boom shells.
Figure 3:
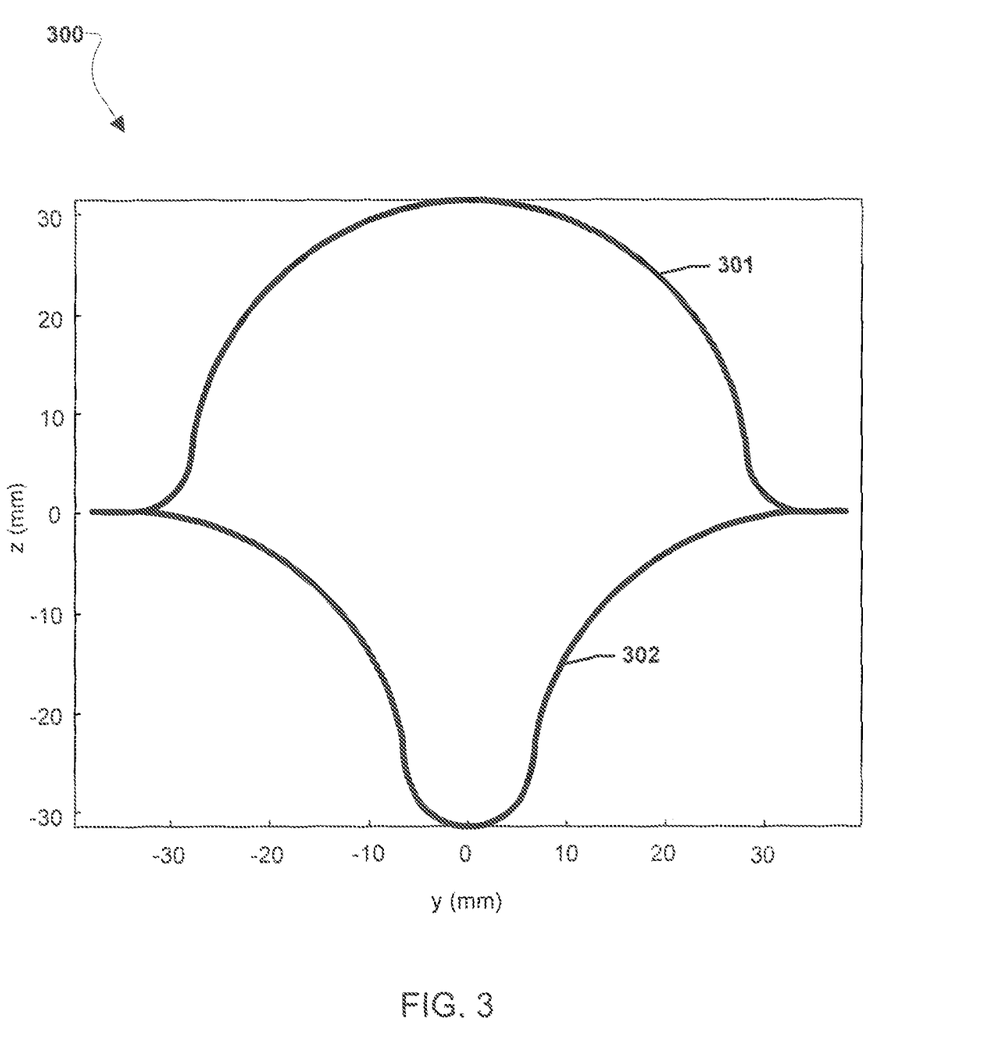
FIGS. 3-7 illustrate cross-section shapes of asymmetric Bi-CTM booms.
Figure 4:
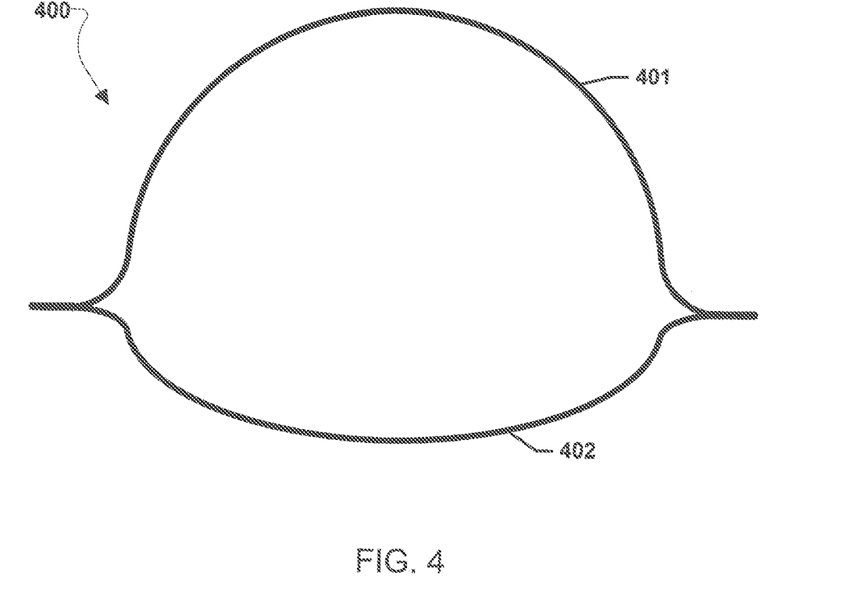
Figure 5:
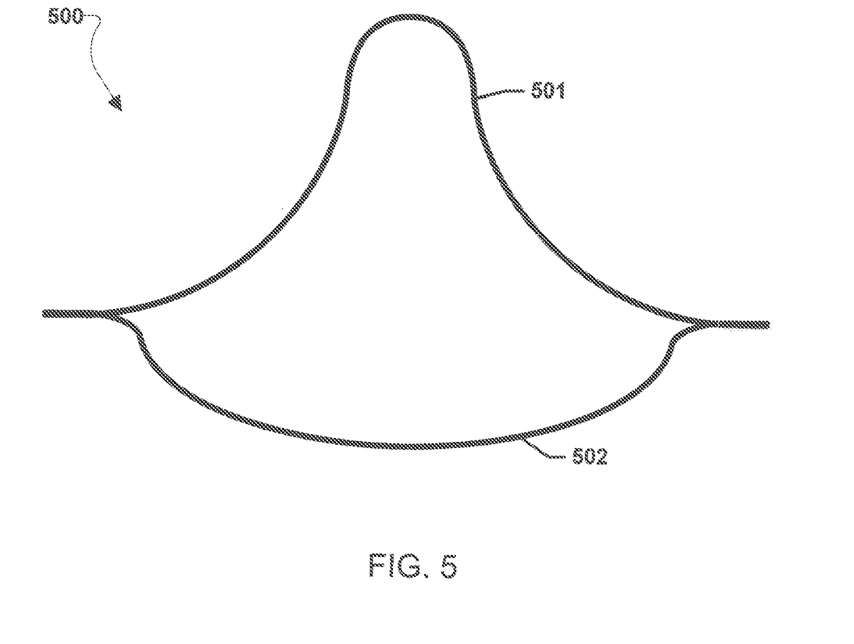
Figure 6:
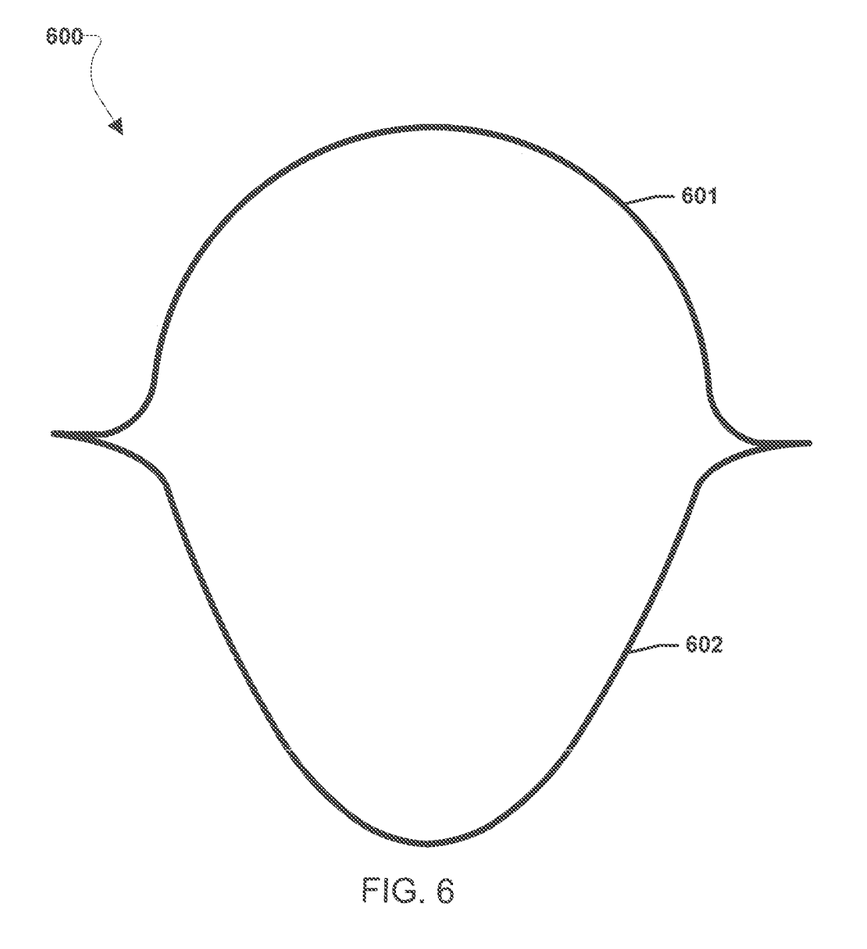
Figure 7:
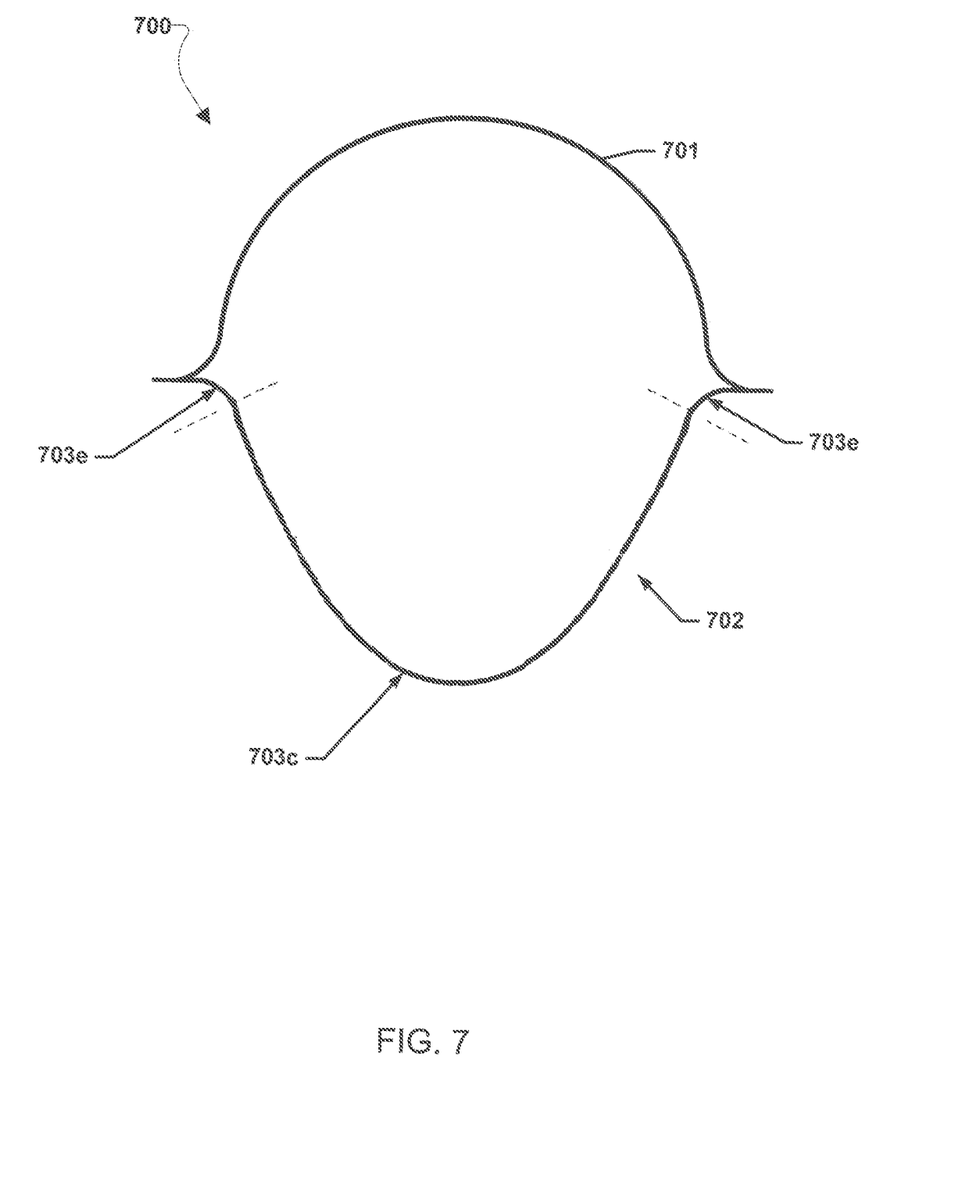

The goal was thus to study if bistable designs of the CTM are indeed possible given the complex geometry of the structure. Cases where the boom geometric symmetry about the affixing line is maintained (same omega-shell geometry), as in FIG. 2, as well as asymmetric shapes, as in FIG. 3, were investigated with the shell composite laminate for each boom half being different in all cases. FIG. 2 illustrates cross-section shapes of two symmetric Bi-CTM booms with a flattened height of h=65 mm (outer lines) and h=110 mm (inner lines). For each boom size, two cross-sections of subtended angles $\alpha=85°$ and a $55°$ arc shown. FIG. 3 illustrates a cross-section shape of an asymmetric Bi-CTM boom 300 with a flattened height of h=110 mm and subtended angles of $\alpha=85°$. The outer shell 301 is the one with the longest R1 central segment, which is the one that induces bistability in the boom 300. The inner shell 302 has a different cross sectional shape than the outer shell 301. In the boom 300 illustrated in FIG. 3, the outer shell 301 may have a cross-section shape formed by three circular arcs (called for reference herein a circular cross-section) and the inner shell 302 may have a different circular cross-section shape. 4 illustrates another asymmetric Bi-CTM boom 400 with an outer shell 401 having a circular cross-section shape and the inner shell 402 may have a cross-section shape formed by three ellipsoidal arcs (called for reference herein an ellipsoidal cross-section). FIG. 5 illustrates another asymmetric Bi-CTM boom 500 with an outer shell 501 having a circular cross-section shape and the inner shell 502 may have an ellipsoidal cross-section shape. FIG. 6 illustrates another asymmetric Bi-CTM boom 600 with an outer shell 601 having a circular cross-section shape and the inner shell 602 having a cross-section shape formed by three parabolic arcs (called for reference herein a parabolic cross-section). Other combinations of different cross-section shapes may be combined as inner shells and outer shells in various embodiment asymmetric Bi-CTM boom shapes. The circular cross-section shapes, ellipsoidal cross-section shapes, and parabolic cross-section shapes may result from shells of embodiments Bi-CTM booms formed with circular, ellipsoidal, parabolic shapes, or combinations of these. As one example, FIG. 7 illustrates an asymmetric Bi-CTM boom 700 with an outer shell 701 having a circular cross-section shape and the inner shell 702 having a cross-section shape formed by two circular cross-section edge portions 703e and a parabolic cross-section central portion 703c. The two edge portions 703e may extend from each side of the one central portion 703c toward the respective webs 704 of the Bi-CTM boom 700.

In general, the shell segments that need to be coiled in an equal-sense way (i.e. the shell's curvature sign does not change during the coiling deformation process), such as those corresponding to radius R1 of the outer shell and radius R2 of the inner shell in FIG. 2, may be made from a bistable laminate such as a $[\pm\theta_i/\theta_j/\pm\theta_i]$, $[\pm\theta_i/\theta_j/90_k/\pm\theta_i]$ or $[\pm\theta_i/\pm\theta_i]$ layup where $\theta$ may be from 30 to 60°, i is 1 or above, j is 0 or above, and k is 0 or above. The shell segments that need to be coiled in an opposite-sense way (i,e. the shell's curvature sign changes during the coiling deformation process from concave to convex), such as those corresponding to radius R2 of the outer shell and radius R1 of the inner shell in FIG. 2, may be made from a more compliant laminate. While not illustrated in FIGS. 1 and 3-7 for clarity of the figures, the relationship of radius R1 portion and radius R2 portion in the outer shell and the radius R1 portion and radius R2 portion in the inner shell as discussed with reference to FIG. 2 applies to FIGS. 1 and 3-7 as well. In other words, the shell segments Corresponding to radius R1 of the outer shells 101, 301, 401, 501, 601, 701 and radius R2 of the inner shells 102, 302, 402, 502, 602, 702 are shell segments that need to be coiled in an equal sense way and the shell segments corresponding to radius R2 of the outer shells 101, 301, 401, 501, 601, 701 and radius R1 of the inner shells 102, 302, 402, 502, 602, 702 are shell segments that need to be coiled in an opposite-sense way. As such each shell, inner or outer, may have one R1 radius shell portion (i.e., the one central portion of that respective shell, one example of which is labeled in FIG. 7 as central portion 703e of inner shell 702) and two R2 radius shell portions (i.e., the two edge portions of that respective shell, one example of which are labeled in FIG. 7 as edge portions 703e of inner shell 702). Together the respective three radius portions R2, R1, R2 define the cross-section shape of that respective shell. In various embodiments, the outer shell may be made of one laminate. In various embodiments, the outer shell may be made from two different laminates such that one laminate firms the radius R1 portion of the outer shell and another laminate forms the radius R2 portion of the outer shell. In various embodiments, the inner shell may be made of one laminate. In various embodiments, the inner shell may be made from two different laminates such that one laminate forms the radius R1 portion of the inner shell and another laminate forms the radius R2 portion of the inner shell. The length of the bistable shell segments may need to be larger than those of the compliant shell segments to achieve bistability. The ratio of segments bending in equal or opposite-sense directions may also be critical to prevent negating the secondary stable coiled configuration. In some embodiments, the shell segments that need to be coiled in an equal-sense way, such as those corresponding to radius R1 of the outer shell and/or radius R2 of the inner shell in FIG. 2, may be bistable and the shell segments that need to be coiled in an opposite-sense way, such as those corresponding to radius R2 of the outer shell and/or radius R1 of the inner shell in FIG. 2, may be compliant or bistable. As one example, only the radius R1 portion of the outer shell may be bistable and the other portions of the outer shell and inner shell may be compliant. As another example, both the radius R1 portion of the outer shell and the radius R2 portion of the inner shell may be bistable while both the radius R2 portion of the outer shell and the radius R1 portion of the inner shell are compliant. As another example, both the radius R1 portion and the radius R2 portion of the outer shell may be bistable and both the radius R1 portion and the radius R2 portion of the inner shell may be compliant. As another example, both the radius R1 portion and the radius R2 portion of the outer shell may be bistable, the R2 portion of the inner shell may be bistable, and the R1 portion of the inner shell may be compliant. As another example, the radius R1 portion of the outer shell and both portions of the inner shell may be bistable and the radius R2 portion of the outer shell may be compliant. In various embodiments, the sum of arc lengths of the two radius R2 portions of the inner shell may be longer than the arc length of the R1 portion of the inner shell.

In various embodiments, the outer shell of a Bi-CTM boom, such as outer shells 101, 301, 401, 501, 601, 701, may be formed from a first composite laminate, and the inner shell of the Bi-CTM boom, such as inner shells 102, 302, 402, 502, 602, 701 may be formed from a second composite laminate. In various embodiments, the first composite laminate may be a different composite laminate than the second composite laminate. As examples, the first composite laminate or the second composite laminate may be: a composite laminate of intermediate modulus (IM) unidirectional carbon fiber formed from MR60H carbon fiber and PMT-F7 epoxy resin; a composite laminate of plain weave IM carbon fiber formed from HTA40 carbon fiber and PMT-F7 resin; a composite laminate of plain weave IM carbon fiber formed from M30S carbon fiber and PMT-F7 resin; a composite laminate of plain weave astroquartz II formed from astroquartz fibers and PMT-F7 resin; a composite laminate of braid IM carbon fiber formed from T300 fibers and PMT-F7 resin; a composite laminate of unidirectional glass fiber formed from S2-glass and PMT-F7 resin; a composite laminate of high modulus (HM) unidirectional carbon fiber formed from HS40 fibers and PMT-F7 resin; or any other type composite laminate, such that the outer shell, such as outer shell 101, 301, 401, 501, 601, 701 is formed from a different composite laminate than the inner shell, such as inner shell 102, 302, 402, 502, 602, 702, in various embodiments, the outer shell of a Bi-CTM boom, such as outer shells 101, 301, 401, 501, 601, 701, and/or the inner shell of the Bi-CTM boom, such as inner shells 102, 302, 402, 502, 602, 702, may be formed from two laminates. For example, the outer shell, such as outer shells 101, 301, 401, 501, 601, 701, may be formed from a combination of a bistable and a compliant laminate pair and/or the inner shell, such as inner shells 102, 302, 402, 502, 602, 702, may be formed from a combination of a bistable and a complaint laminate pair. Shells 101 and 102, 301 and 302, 401 and 402, 501 and 502, 601 and 602, 701 and 702, may be affixed together in various manners, for example by co-cure, bonding with EA9628 film epoxy, etc. In various embodiments, the outer shell, such as outer shell 101, 301, 401, 501, 601, 701, may be a bistable shell segment. For example, the outer shell, such as outer shell 101, 301, 401, 501, 601, 701, may be made from a bistable laminate such as a $[\pm\theta_i/\theta_j/\pm\theta_i]$, $[\pm\theta_i/\theta_j/90_k/\pm\theta_i]$ or $[\pm\theta_i/\pm\theta_i]$ layup where $\theta$ may be from 30° to 60°, i is 1 or above, j is 0 or above, and k is 0 or above. In various embodiments, the inner shell, such as inner shells 102, 302, 402, 502, 602, 702, may also be a bistable shell segment. In various embodiments, the inner shell, such as inner shells 102, 302, 402, 502, 602, 702, may not be a bistable shell segment.

Various embodiments may provide methods for fabricating a Bi-CTM boom, such as Bi-CTM booms 100, 300, 400, 500, 600, 700 described above, including providing an outer shell formed from a first composite laminate, providing an inner shell formed from a second different composite laminate, and affixing the outer shell to the inner shell. The shells may be affixed, for example by, joining (e.g., bonding, stitching, welding, etc.), co-curing, or otherwise structurally affixing the shells to one another.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A bistable collapsible tubular mast (Bi-CTM) boom having a stable coiled configuration and a stabled deployed configuration, comprising:
    a first shell comprised of a first composite laminate, the first composite laminate configured to promote bistability;
    a second shell comprised of a second composite laminate, the first shell further comprised of a third composite laminate different from the first composite laminate, wherein:
        the first shell is affixed to the second shell at two flat webs;
        the first shell comprises a first cross-section shape formed from one first central portion and two first edge portions extending from each side of the one first central portion toward respective flat webs of the Bi-CTM boom, the one first central portion having a different curvature direction than the two first edge portions, and wherein the one first central portion is formed from the first composite laminate and the two first edge portions are formed from the third composite laminate;
        the second shell comprises a second cross-section shape formed from one second central portion and two second edge portions extending from each side of the one second central portion toward the respective flat webs, the one second central portion having a different curvature direction than the two second edge portions; and
        the first central portion and the second central portion having same sign curvatures such that the first central portion and the second central portion are convex in the stable deployed configuration of the Bi-CTM boom.

2. The Bi-CTM boom of claim 1, wherein the third composite laminate is not configured to promote bistability.

3. The Bi-CTM boom of claim 1, wherein the second shell further comprises a fourth composite laminate different from the second composite laminate and wherein the one second central portion is formed from the second composite laminate and the two second edge portions are formed from the fourth composite laminate.

4. The Bi-CTM boom of claim 1, wherein:
    the second shell further comprises a fourth composite laminate different from the second composite laminate; and
    the second composite laminate is configured to promote bistability and the third composite laminate and fourth composite laminate are not configured to promote bistability.

5. A bistable collapsible tubular mast (Bi-CTM) boom, comprising:
    a first shell comprised of a first composite laminate and a third composite laminate different from the first composite laminate; and
    a second shell comprised of a second composite laminate and a fourth composite laminate different from the second composite laminate,
    wherein:
        the first shell is affixed to the second shell;
        the first composite laminate is different than the second composite laminate; and
        the first composite laminate, the second composite laminate and the third composite laminate are bistable and the fourth composite laminate is not bistable.

6. A bistable collapsible tubular mast (Bi-CTM) boom having a stable coiled configuration and a stabled deployed configuration, comprising:
    a first shell comprised of a first composite laminate, the first composite laminate is configured to promote bistability; and
    a second shell comprised of a second composite laminate, wherein:
        the first shell is affixed to the second shell at two flat webs;
        the first shell comprises a first cross-section shape formed from one first central portion and two first edge portions extending from each side of the one first central portion toward respective flat webs of the Bi-CTM boom, the one first central portion having a different curvature direction than the two first edge portions;
        the second shell comprises a second cross-section shape formed from one second central portion and two second edge portions extending from each side of the one second central portion toward the respective flat webs, the one second central portion having a different curvature direction than the two second edge portions; and
        the first central portion and the second central portion having same sign curvatures such that the first central portion and the second central portion are convex in the stable deployed configuration of the Bi-CTM boom
    and further wherein:
    the first central portion is bistable; and
    the two first edge portions, the second central portion, and the two second edge portions are all bistable, the two first edge portions, the second central portion, and the two second edge portions are all not bistable, the two first edge portions are bistable while the second central portion and the two second edge portions are not bistable, the two first edge portions are not bistable while the second central portion and the two second edge portions are bistable, the two first edge portions and the second central portion are not bistable while the two second edge portions are bistable, or the two first edge portions and the two second edge portions are bistable while the second central portion is not bistable.

7. A bistable collapsible tubular mast (Bi-CTM) boom having a stable coiled configuration and a stabled deployed configuration, comprising:
- a first shell comprised of a first composite laminate, the first composite laminate is configured to promote bistability; and
- a second shell comprised of a second composite laminate, wherein:
  - the first shell is affixed to the second shell at two flat webs;
  - the first shell comprises a first cross-section shape formed from one first central portion and two first edge portions extending from each side of the one first central portion toward respective flat webs of the Bi-CTM boom, the one first central portion having a different curvature direction than the two first edge portions;
  - the second shell comprises a second cross-section shape formed from one second central portion and two second edge portions extending from each side of the one second central portion toward the respective flat webs, the one second central portion having a different curvature direction than the two second edge portions; and
  - the first central portion and the second central portion having same sign curvatures such that the first central portion and the second central portion are convex in the stable deployed configuration of the Bi-CTM boom;
- and further wherein the second composite laminate and the first composite laminate are different composite laminates and the second shell further comprises a third composite laminate different from the second composite laminate.

8. The Bi-CTM boom of claim 1, wherein:
the second shell further comprises a fourth composite laminate different from the second composite laminate; and
the fourth composite laminate is configured to promote bistability and the second composite laminate and third composite laminate are not configured to promote bistability.

* * * * *